Dec. 6, 1932.  G. P. SCHADELL ET AL  1,890,266
FISH LURE
Filed May 26, 1931
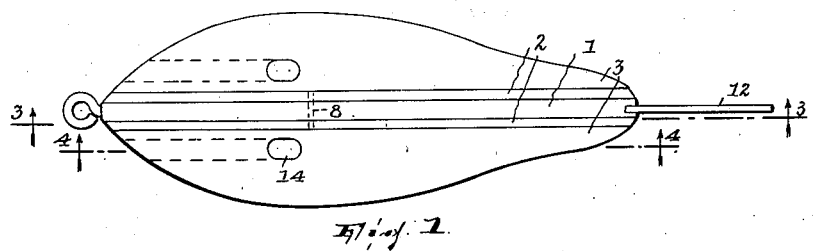
Fig. 1.
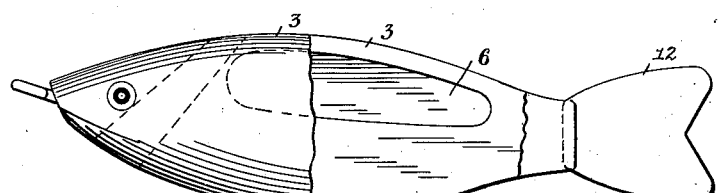
Fig. 2.
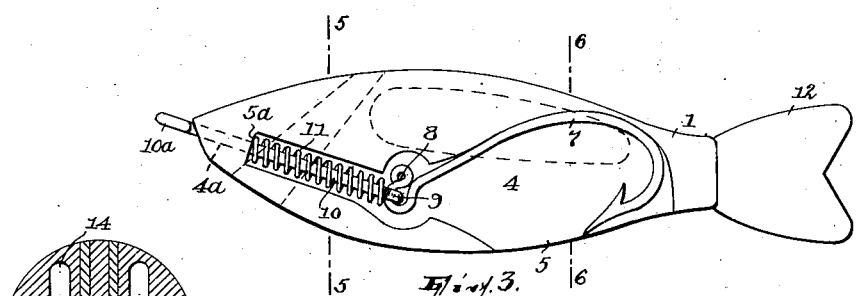
Fig. 3.
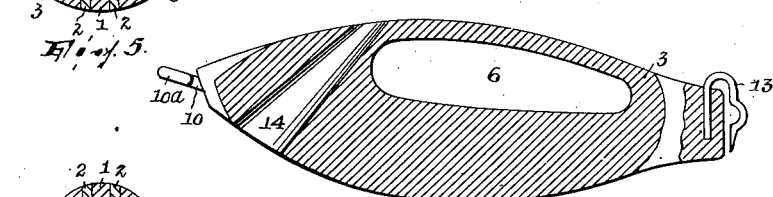
Fig. 4.
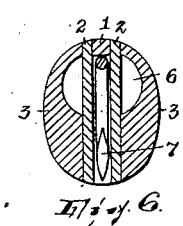
Fig. 5.
Fig. 6.
INVENTORS
George P. Schadell
and Stuart B. Gleason,
BY their ATTORNEY Patented Dec. 6, 1932

1,890,266

UNITED STATES PATENT OFFICE

GEORGE P. SCHADELL, OF PATERSON, AND STUART B. GLEASON, OF PASSAIC, NEW JERSEY

FISH LURE

Application filed May 24, 1931. Serial No. 540,052.

This invention relates to fish lures or artificial bait.

It is known to provide a fish lure of the draft type (by which we mean having an elongated body to one end of which the line is connected and which is adapted to trail the line when in the water either due to a pull on the line or the motion of the water) with an air-cell to render it more or less buoyant.

It is also known to provide the body of a fish lure with a cavity in which is contained a hook adapted to protrude from the body, as for instance where it is normally contained therein and movable to protrude when the fish "takes" the lure and exerts a tug thereon.

We aim to provide a lure which will embody these features and which may be successfully used either for casting or trolling and which may be manufactured at the minimum expense and will be proof against swelling or warping by the action of the water and otherwise substantial and durable.

So far as is concerned the buoyant feature of our lure when of the draft type and having an elongated body, we attain this by forming its body of laminated longitudinal sections which together form an air-cell substantially closed to the admission of water thereto. Heretofore such cells, if substantially closed against admission of water, have been formed by boring a hole in the body and plugging the hole. In the preferred form the area of the cell of our lure represents a minor portion of the area of either of the meeting faces of the sections, whereby a good sealing of the cell from the area is possible and may be effected in manufacture with facility and at consequently reduced cost.

So far as is concerned the feature involving the presence of a cavity in the lure body containing a hook adapted to protrude therefrom, our invention contemplates a lure body including three laminated sections the middle one of which has a cavity open at both faces thereof which adjoin, but being closed by, the other two sections and having an opening to the exterior of the body between said other sections, in combination with a hook in said cavity adapted to protrude at said opening. Here again, manufacture is facilitated and cheapened, it requiring but simple steps to form the middle section with the cavity and then assemble the three sections in laminated arrangement.

In the actual construction herein shown the two principal features are combined in a novel way so as to produce other desirable results.

In the drawing,

Fig. 1 is a top plan view of the lure;

Fig. 2 is a side elevation, partly broken away;

Fig. 3 a side elevation with the two of the sections below the line 3—3 in Fig. 1 removed;

Fig. 4 is a section on line 4—4, Fig. 1; and

Figs. 5 and 6 are sections on lines 5—5 and 6—6, Fig. 3.

In the example the body of the lure has the form of a small fish, but that of course is immaterial. It is shown as comprising five longitudinal layers, a middle thick flat layer 1, two thin layers 2 flanking the middle layer and two thick layers 3 flanking the group of layers 1 and 2, all the layers extending lengthwise of the body.

The middle layer 1 (Fig. 3) has a cavity 4 shaped to receive the hook as will appear and open at one of its upper and lower edges, here the lower one, as at 5; this cavity is here formed so that it is open at both of the flat or upright surfaces of the layer 1. It also has a bore 4a which extends through the forward or mouth end of the lure and communicates with the cavity.

The layers 3 have pockets or recesses 6 near their upper edges and open only at their inner faces.

The layers 2 are plain flat slabs which in the assembled relation of all the layers close the cavity 4 at both sides and close and make air-tight the pockets 6, thus producing air-cells.

All the layers are secured together in any manner, but to insure that the pockets 6 are sealed or air-tight cement is preferably used, of course of the water-proof variety. Since the air-cells are offset from the longitudinal axis of the body they act to preserve it from capsizing, or here upright, in the water.

7 is the hook. It is in this example pivoted and to this end its shank end is formed with an S-bend, the upper loop of which forms its bearing and is journaled on a transverse horizontal pin 8 which ends are seated in the layers 2 and which traverses cavity 4, the other loop of the S-bend having an eye 9 at one end of the rod 10 connected therewith and extending through bore 4a, its forward end having an eye 10a to which the fish line (to wit, the line itself or the line proper and leader) may be connected. Between the abutment formed by eye 9 and an abutment 5a of the cavity a spring 11, coiled about the rod, is held under compression and tends to hold the hook, whose hook-end projects downwardly, retracted or concealed in the lure body. When a tug comes on the lure the hook is obviously projected from the body.

There may be suitably attached to the body a flexible, as a rubber, tail 12; or a caudal hook 13 to which to attach pork-rind or the like.

The layers of our lure can all be made of celluloid or other cheap minor plastic, not affected by water and giving the desired weight to the lure, by molding or otherwise fashioning the same.

The body of the lure, when the latter is of the draft type, is preferably provided, in addition to means to oppose capsizing of the lure (as the mentioned air-cell or cells offset from its longitudinal axis), with a water passage or passages 14 at its forward end extending upwardly and rearwardly in an inclined direction and through the body. This causes the lure, when under draft, to drive intermittently in the water, thus to increase its attractiveness to the fish.

In a sense, our lure comprises three sections, two outer sections (here formed by the layers 3) and a middle section (here formed by the layers 1 and 2), the middle section and each outer section together forming an air-cell at one side of the middle section substantially closed to the admission of water thereto.

The air cells being spaced from each other accommodate the hook cavity 4 between them; thus the bight of the hook may have a dimension approximating the corresponding dimension of the lure and the two cells may balance each other in their buoyant effect.

Having thus fully described our invention what we claim is:

1. A fish lure of the draft type consisting of an elongated body including three laminated longitudinal sections, the middle section and each of the other two sections together forming at one side of the middle section an air-cell substantially closed to the admission of water thereto.

2. A fish lure of the draft type consisting of an elongated body including three laminated longitudinal sections, the middle section and each of the other two sections together forming at one side of the middle section an air-cell substantially closed to the admission of water thereto and said cells being arranged substantially side by side.

3. A fish lure of the draft type consisting of an elongated body including three laminated layers, the middle layer having a cavity formed open at both faces thereof which adjoin, but being closed by, the other two layers and having an opening to the exterior of the body between said other layers, in combination with a hook in said cavity to protrude at said opening, said body having a substantially closed air-cell offset from its longitudinal axis and opposing capsizing of the lure.

4. A fish lure of the draft type consisting of a body including five layers each of the two outermost of which forms with the next adjoining layer, an air-cell substantially closed to admission of water thereto and the middle one of which five layers having a cavity formed open at both faces thereof which adjoin, but being closed by, the next adjoining layers and having an opening to the exterior of the lure between the latter layers, in combination with a hook in said cavity to protrude at said opening.

5. A fish lure of the draft type consisting of an elongated body having a pair of side-by-side spaced air-retaining cells offset to one side of the longitudinal axis of the body and a cavity extending into said body from its exterior surface at the other side of said axis, in combination with a hook in said cavity to protrude therefrom and arranged in a plane extending between the two cells.

6. A fish lure of the draft type consisting of an elongated body having a pair of side-by-side spaced air-retaining cells offset to one side of the longitudinal axis of the body and a cavity extending into said body from its exterior surface at the other side of said axis and between the cells, in combination with a hook in said cavity to protrude therefrom.

7. A fish lure of the draft type consisting of an elongated body including three laminated sections, the middle section and each of the other two sections together forming at one side of the middle section an air-cell substantially closed to the admission of water thereto and the middle section having a cavity open to the exterior of said body, in combination with a hook in said cavity to protrude therefrom.

8. A fish lure of the draft type comprising a body having a longitudinally extending cavity open to the exterior of the body, a hook housed and pivoted in the cavity and having a loop near the pivot for the hook, said body having a bore extending forwardly to the exterior thereof from the cavity, a rod longitudinally movable in the bore and having an eye connected to said loop, and a compression spring coiled around the rod in the cavity and abutting said body within the cavity at one of its ends and the eye at its other end.

In testimony whereof we affix our signatures.

GEORGE P. SCHADELL.
        STUART B. GLEASON.